Dec. 27, 1927.
M. D. MANN, JR
1,654,181
APPARATUS FOR THE TREATMENT OF GASES WITH LIQUIDS
Filed May 14, 1920    2 Sheets-Sheet 2
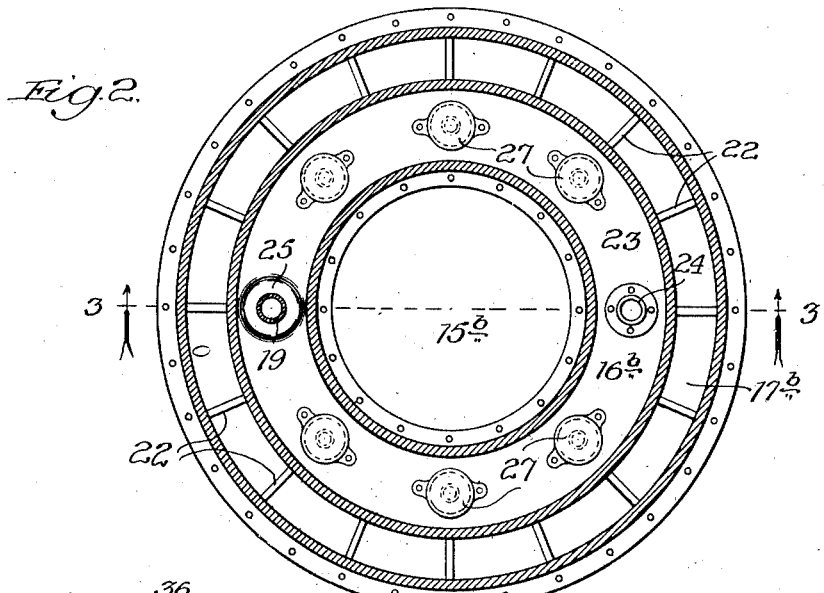
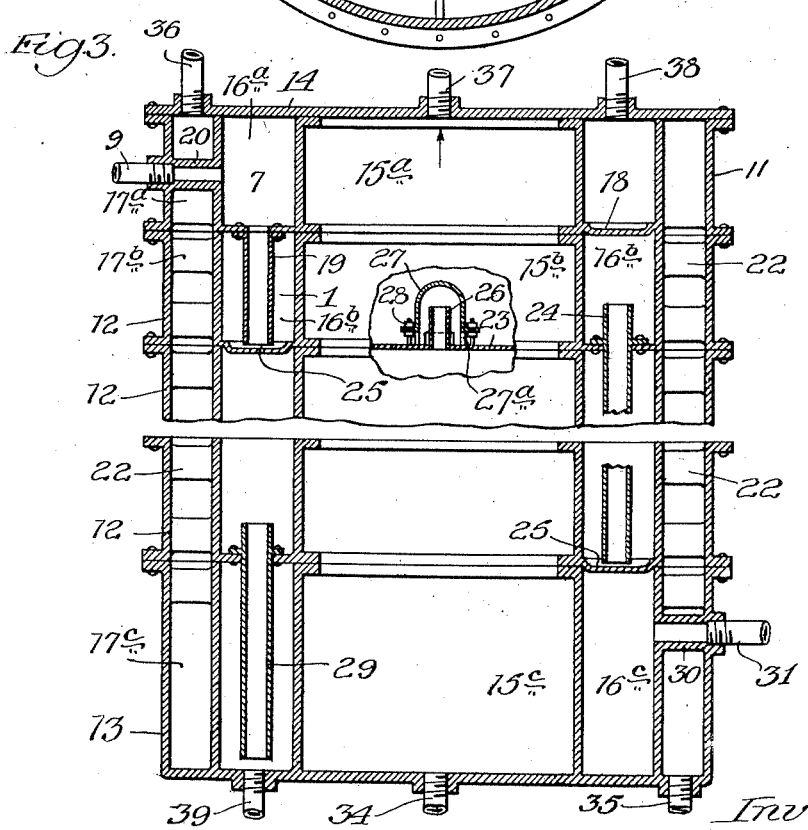

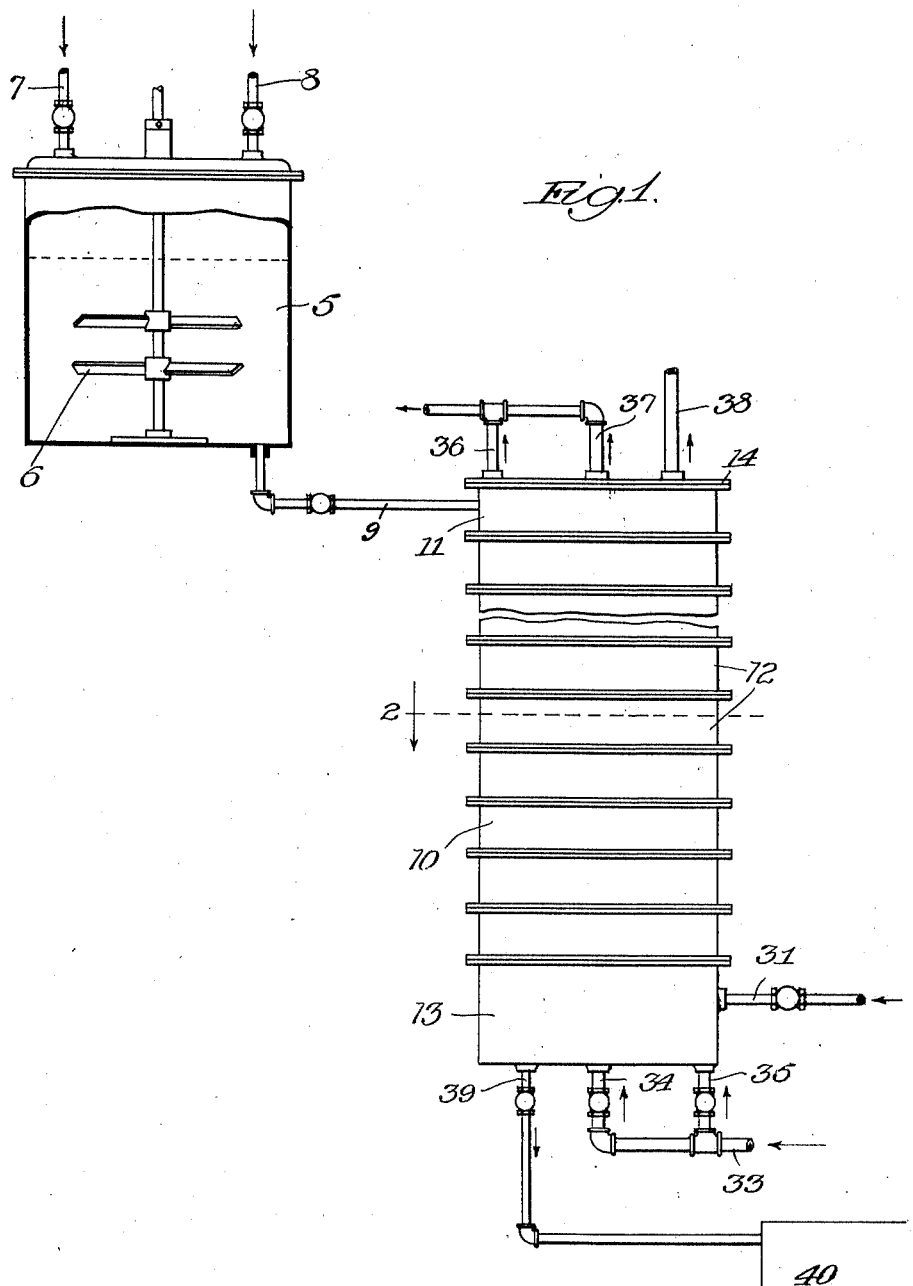

Patented Dec. 27, 1927.

1,654,181

UNITED STATES PATENT OFFICE.

MATTHEW D. MANN, JR., OF ROSELLE, NEW JERSEY, ASSIGNOR TO SETH B. HUNT, TRUSTEE, OF MOUNT KISCO, NEW YORK.

APPARATUS FOR THE TREATMENT OF GASES WITH LIQUIDS.

Application filed May 14, 1920. Serial No. 381,301.

The present invention relates to an apparatus for the continuous treatment of gases with liquids, and will be clearly understood from the following description thereof, illustrated by the accompanying drawings, in which Figure 1 is an elevation of an apparatus which may be used in connection with the invention;
Figure 2 is a horizontal section through the tower shown in Figure 1 on line 2 of that figure; and Figure 3 is a vertical section through the tower on line 3—3 of Fig. 2.
In the treatment of gases with liquids it may become desirable that a mixture of immiscible liquids be employed, the thoroughness or intimacy of the mixture being maintained throughout the treatment. Thus in the treatment of the distillation gases from petroleum or hydrocarbon oil stills with sulfuric acid of a suitable strength, say, 1.8 sp. gr., for the conversion of the olefine hydrocarbons present into sulfated compounds, it is advantageous that the acid employed be admixed with a neutral hydrocarbon or paraffin oil, in considerable proportions, say up to five times the quantity of acid employed. In accordance with the present invention the treatment of the mixed liquids with the gas may be effected as follows, reference being made to the accompanying drawings.

The liquids, which may be, for example, sulfuric acid of 1.8 sp. gr. and a saturated paraffin oil, are supplied in the required proportions (say 1 part of acid to 5 parts of oil) through pipes 7 and 8 to a receptacle 5 provided with rotating agitators. The rotation of the agitators 6 keeps the liquids thoroughly intermingled. From the receptacle 5 the mixture passes through valved pipe 9 to the top section 11 of treatment tower 10. In this tower the mixture is utilized for the treatment of a gas, the temperature being carefully controlled by the use of a cooling liquid, such as water.

As is clearly shown in the drawings, the tower may be constructed of a number of units or sections, there being a top unit 11, and a bottom unit 13, and a plurality of intermediate units 12. The top unit is provided with a cover 14, and its interior is divided into a central chamber $15^a$, an annular chamber $16^a$ enclosing the central chamber, and an outer annular chamber $17^a$ surrounding the chamber $16^a$. The chambers $17^a$ and $16^a$ are open at their bottoms, thereby permitting communication with the corresponding sections of the intermediate units. The intermediate or treatment compartment $16^a$ is provided with a closed bottom 18, from one point in which a pipe section 19, which communicates with the interior of the compartment $16^a$, depends into the corresponding compartment of the next lower section of the tower. A conduit 20 communicating with the interior of the chamber or compartment $16^a$ passes through the outer compartment $17^a$, and internal threads or other means may be provided for its connection with an inlet pipe 9, through which the mixed liquids may be directly introduced into the intermediate compartment $16^a$. Means are provided for the passage of the gas from the lower unit of the tower into the compartment $16^a$ of the top unit, these being of the same type as are hereinafter described in connection with the intermediate unit 12.

The intermediate units 12 are each formed with a central compartment $15^b$, an annular intermediate compartment $16^b$ surrounding it, and an annular compartment $17^b$ surrounding the intermediate compartment $16^b$. These compartments of the intermediate units are so proportioned that when assembled their walls will be continuous with the walls of the other intermediate units and also with the top unit 11 and the bottom unit 13 which will be hereinafter described. The central compartment $15^b$ and the outer compartment $17^b$ of the intermediate units are open both above and below, a plurality of webs 22—22 being provided between the walls of the outer compartment $17^b$, and preferably integrally cast therewith, in order to retain the outer walls of the sections in their proper positions. The intermediate or treatment compartment $16^b$, which is aligned with the corresponding compartment $16^a$ of the top section 11, is provided with a bottom closure 23 through which at one point a pipe section 24 passes and is secured by any suitable means, for example, by bolts. The pipe section 24 projects upwardly a short distance above the bottom 23 of the compartment, thereby determining the height of the liquid retained therein. It projects downwardly into the corresponding compartment of the next lower unit, terminating a very short distance above a slight cup or concavity 25 formed in the bottom of that compartment in the lower section. An identical cup or concavity 25 in the intermediate unit directly below the pipe section 11 receives the end of the pipe section 19. The bottom of each intermediate or treatment compartment 16$^b$ is provided at spaced intervals with a plurality of upwardly projecting pipe sections 26, open at top and bottom. These are covered by bells 27 which rest upon the bottom 23 of the compartment and are provided with openings 27$^a$ near their base. They are secured, for example, by the lugs and bolts 28. These bells permit the passage of gas, causing it to be distributed and bubbled through the liquid in the treatment compartment. The intermediate compartment 16$^a$ of the top section 11 is provided with similar bells. The positions of the pipe sections 24 for passage of liquid from one unit to another are preferably alternated in the successive units of the tower, being first at one side and then at the opposite side of the tower.

The lowermost unit of the tower 13 is likewise provided with a central compartment 15$^c$, a treatment compartment 16$^c$ surrounding this, and an outer jacket or compartment 17$^c$ surrounding the treatment compartment 16$^c$. The unit is completely closed at its bottom, and the pipe section 29 depending from the intermediate unit 12 just above it, is somewhat prolonged to reach near the bottom of the unit 13. The interior compartment 15$^c$, intermediate compartment 16$^c$, and the outside compartment of the bottom unit 13 are open at their tops, and the several compartments are aligned with the corresponding compartments of the intermediate and top units. A conduit 30 passes from the treatment compartment 16$^c$ through the outer compartment 17$^c$, and is provided with means, such as internal threads for connection with the valved inlet pipe 31 for the gas to be treated.

When assembled, for example, by bolting together flanges provided on each unit, a construction is formed in which there is a central compartment and an outermost compartment extending entirely through the device, between which is an annular treating compartment in which the treatment of the gas with the mixed liquids is effected. The heat controlling medium, for example, cold water, enters from a main 33 through valved pipes 34 and 35, into the interior compartment 15$^c$ and the outermost compartment 17$^c$ of the tower, and is withdrawn through connected outlet pipes 36 and 37 at the top of the tower. The mixed liquid coming from the receptacle 5 enters the intermediate or treatment compartment 16$^a$ through pipe 9 and conduit 20, flowing from the top section 11 to the bottom, through pipe 19, and from one intermediate section to another through pipes 24, and finally from the last intermediate section to the bottom section 13 through pipe 29. By positioning the upper end of the pipes 24 and 29 a short distance above the bottoms of the respective intermediate sections, a determined level of liquid is maintained in each section, and by the alternate arrangement of these overflow pipes on different sides of the tower a circulation and continual intermixture of the liquid is secured.

The petroleum distillation gases to be treated enter the intermediate or treatment compartment 16$^c$ of the bottom section 13 through valved inlet pipe 31 and conduit 30. These gases contain the reactive portions of the gas (the olefines) in admixture with an equal or a greater quantity of non-reactive gas (the saturated hydrocarbons). They travel upwardly through the various sections of the tower, entering the bells 27 of each of the intermediate sections and of the top section, and bubble through the liquid around the bases of the bells 27 in the several sections. This bubbling action of the gas through the liquid not only effects its better contact therewith, but, together with the circulation of the latter, effects a continual intermixture or emulsification of the ingredients of the liquid and prevents their separation into distinct layers in the various sections of the tower. The gases gradually rise through the tower passing in counter current to the descending liquid, coming first into contact with liquid which has been previously subjected to the action of the gases while the treated gases are in their ascent subjected to the treatment with fresher and fresher liquid. The mixing action of the gases persists in their passage through the tower by reason of the excess of non-reacting gases present. The gases escape from the apparatus through pipe 38, which leads them to any suitable gasometer or to another treatment chamber if desired.

The gas is preferably supplied to the device at a pressure considerably above atmospheric, say 4 to 5 atmospheres and the entire absorption tower, that is, the treatment chamber therein, is maintained under such pressure. It has been found that by maintaining such a pressure an improved absorption and reaction is secured. The circulation of cooling liquid is preferably controlled to maintain a temperature below 30° C. in the treatment chamber.

The mixed liquids pass off through the pipe 39 from the bottom section 13 of the tower and enter a suitable receptacle 40, in which they are permitted to separate, the hydrocarbon oil utilized rising to the top while the acid liquor containing the sulfates of the unsaturated hydrocarbons of the gas settles to the bottom and may be drawn off for further treatment, for example, conversion into alcohols, acetylation, halogenation, or the like.

I claim:

1. In a device for treating gas with a mixture of immiscible liquids, a central chamber, an intermediate or treating chamber surrounding the central chamber and an outer chamber surrounding the intermediate chamber, means for introducing the mixture of liquids into the intermediate chamber in the upper portion thereof, means for subdividing the mixture of liquids into a plurality of separated strata in its descent through the intermediate chamber and maintaining it constantly intermingled and means for introducing the gas to be treated into the intermediate chamber near its lower portion, means for causing the gas to bubble through each of the strata of liquid in the intermediate chambers and means for introducing heat controlling fluid into the outer and central chambers and for withdrawing it therefrom.

2. In a device for treating gas with a mixture of immiscible liquids, a central chamber, an intermediate chamber surrounding the central chamber, said intermediate chamber being provided with a plurality of intermediate horizontal partitions, overflow pipes feeding from a predetermined level above each partition to the next lower partition, inlets for gas from below each partition to above it, means for introducing gas in the lower portion of said intermediate chamber and withdrawing it from the upper portion, and means for introducing the mixture of liquids into the upper portion of the intermediate chamber and removing it from the lower portion thereof, an outer chamber surrounding the intermediate chamber, means for introducing a temperature controlling liquid into the lower portions of the central and outer chambers, and means for withdrawing it from the upper portions thereof.

3. A sectional unit for a device for treating gas with a mixture of liquids, comprising a central chamber and an outer surrounding chamber, each open at the top and at the bottom, an intermediate chamber between the central and outer chambers, means for closing said intermediate chamber at its bottom, means for conveying liquid from a predetermined level above the bottom of said intermediate chamber to below its bottom, and means opening below the bottom of said closing means for introducing gas above it and below the level of liquid established in the intermediate chamber.

4. A sectional unit for a device for treating a gas with a mixture of liquids, comprising a central chamber and an outer surrounding chamber, each open at the top and at the bottom, an intermediate chamber between them provided with a closure, a pipe section passing through said closure from a predetermined point above it to a predetermined point below it, and a plurality of gas introducing bells communicating with the space below the closure for introducing gas below the level of the liquid established in said intermediate chamber.

5. A device for treating liquids with gases comprising a plurality of like sectional units superimposed, one upon another, each of said units consisting of a central and an outer surrounding chamber, each open at the top and at the bottom and an intermediate chamber between them provided with a closure at its bottom, means for withdrawing liquid from a predetermined level in the intermediate compartment of each unit and conducting it into the corresponding compartment of the next lower unit and a plurality of gas bells open at the bottom for receiving gas from each unit and bubbling it into the liquid in the unit next above, a bottom sectional unit upon which said units are superimposed, said bottom unit being provided with compartments corresponding to and registering with the compartments of the units beforementioned, said compartments of said bottom unit being open at the top, a top sectional unit having compartments corresponding to and registering with the like compartments of the before mentioned sections, each of said compartments being closed at the top and the intermediate compartment being closed at the bottom, means for permitting gas to pass from the lower sections into the intermediate compartment of the top section and means for permitting liquid to pass from the intermediate compartment of the top section into the lower sections, the top section being likewise provided with means for the outlet of liquid from the central and outer compartments and for the inlet of liquid into the intermediate compartment and the bottom section being provided with means for the inlet of liquid into the central and outer compartments and for the inlet of gas into the intermediate compartment and for the outlet of liquid therefrom.

MATTHEW D. MANN, Jr.